DEVICE FOR FASTENING A COMPONENT TO A MOUNTING PLATE

Filed Nov. 30, 1960 5 Sheets-Sheet 1

INVENTORS
OSKAR EDVIN RUDOLF NORDSTRÖM
PER OLOF RAGNAR PERSSON
BY Hane and Nydick
ATTORNEYS

DEVICE FOR FASTENING A COMPONENT TO A MOUNTING PLATE

Filed Nov. 30, 1960

INVENTORS
OSKAR EDVIN RUDOLF NORDSTRÖM
PER OLOF RAGNAR PERSSON
BY Hane and Nydick
ATTORNEYS March 30, 1965 O. E. R. NORDSTRÖM ET AL 3,176,062

DEVICE FOR FASTENING A COMPONENT TO A MOUNTING PLATE

Filed Nov. 30, 1960 5 Sheets-Sheet 3

INVENTORS
OSKAR EDVIN RUDOLF NORDSTRÖM
PER OLOF RAGNAR PERSSON
BY Hane and Nydick
ATTORNEYS

DEVICE FOR FASTENING A COMPONENT TO A MOUNTING PLATE

Filed Nov. 30, 1960 5 Sheets-Sheet 4

INVENTORS
OSKAR EDVIN RUDOLF NORDSTRÖM
PER OLOF RAGNAR PERSSON
BY Hane and Lydick
ATTORNEYS

DEVICE FOR FASTENING A COMPONENT TO A MOUNTING PLATE

Filed Nov. 30, 1960 5 Sheets-Sheet 5

INVENTORS
OSKAR EDVIN RUDOLF NORDSTRÖM
PER OLOF RAGNAR PERSSON
BY Hane and Nydick
ATTORNEYS

United States Patent Office 3,176,062
Patented Mar. 30, 1965

3,176,062

DEVICE FOR FASTENING A COMPONENT TO A MOUNTING PLATE

Oskar Edvin Rudolf Nordström, Hagersten, and Per Olof Ragnar Persson, Linkoping, Sweden, assignors to Telefonaktiebolaget L M Ericsson, Stockholm, Sweden, a corporation of Sweden Filed Nov. 30, 1960, Ser. No. 72,731
Claims priority, application Sweden, Dec. 4, 1959, 11,431/59
11 Claims. (Cl. 174—52)

This invention refers to devices for fastening a component to a mounting plate, for example in telephone instruments. When manufacturing such instruments it is desirable to fasten such components, which belong together from a connection point of view, on a common support, for example on a mounting plate which then can be adjusted and mounted as a unit. So it is for example possible to mount all such elements, which are to be soldered, for example a coil, capacitors, resistance, spring set etc., on a plate of insulating material, for example a "printed-circuit" plate. It is then possible to solder all the components simultaneously. In such a case it has proved difficult to fasten a component to a plate of that kind in such a way that the fastening becomes simple and cheap and may occur without additional separate fastening details. The purpose of this invention is to eliminate the inconveniences now mentioned. According to a special embodiment of the invention the mounting plate with the components may be mounted on a base plate in a telephone instrument in such a way that certain components are fastened to the base plate and thereby may be exposed to comparatively great mechanical forces without being dislocated.

Figure 1:
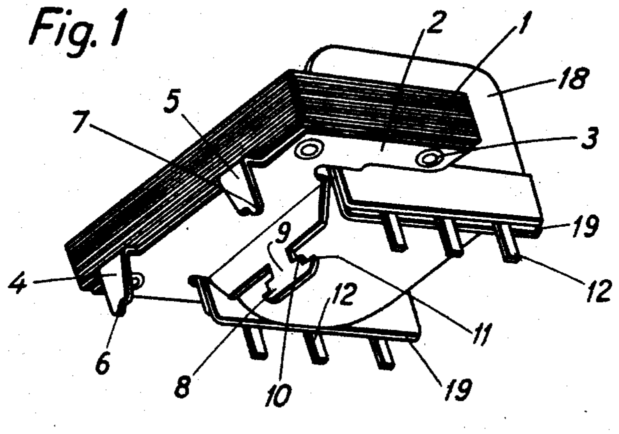
Figure 2:
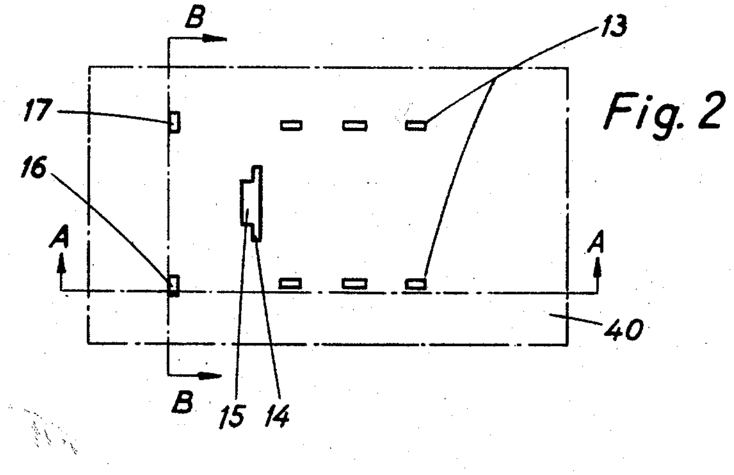
Figure 3:
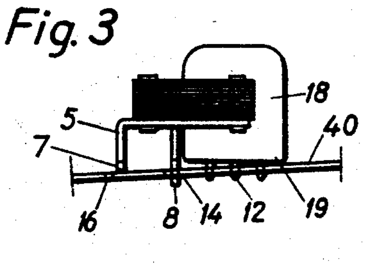
Figure 4:
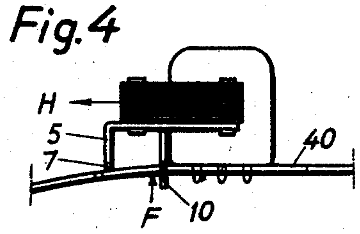
Figure 5:
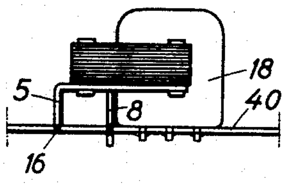
Figure 6:
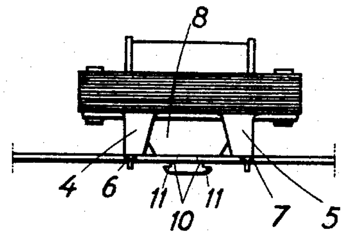

The invention will be further described with reference to the attached drawings which show different embodiments. FIG. 1 is a perspective view of a transformer seen from below and FIG. 2 is a top plan view showing a part of a mounting plate. FIGS. 3–5 show different phases in the fastening of the transformer to the base plate, each of these figures being a section (on a reduced scale) along the line A—A in FIG. 2, the transformer nevertheless being supposed to be located on the plate. FIG. 6 is a corresponding section along the line B—B in FIG. 2.

Figure 7:
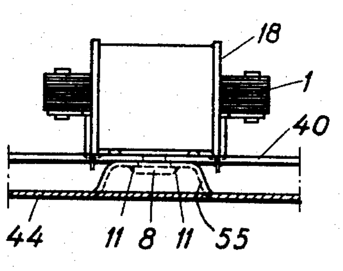
Figure 8:
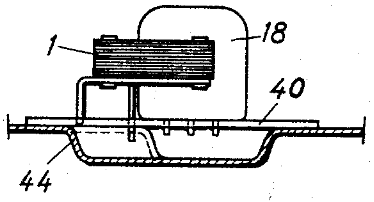
Figure 9:
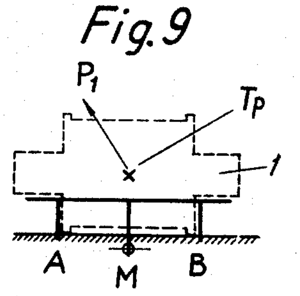
Figure 10:
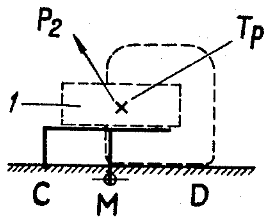
Figures 11, 12, 13, 14, 17:
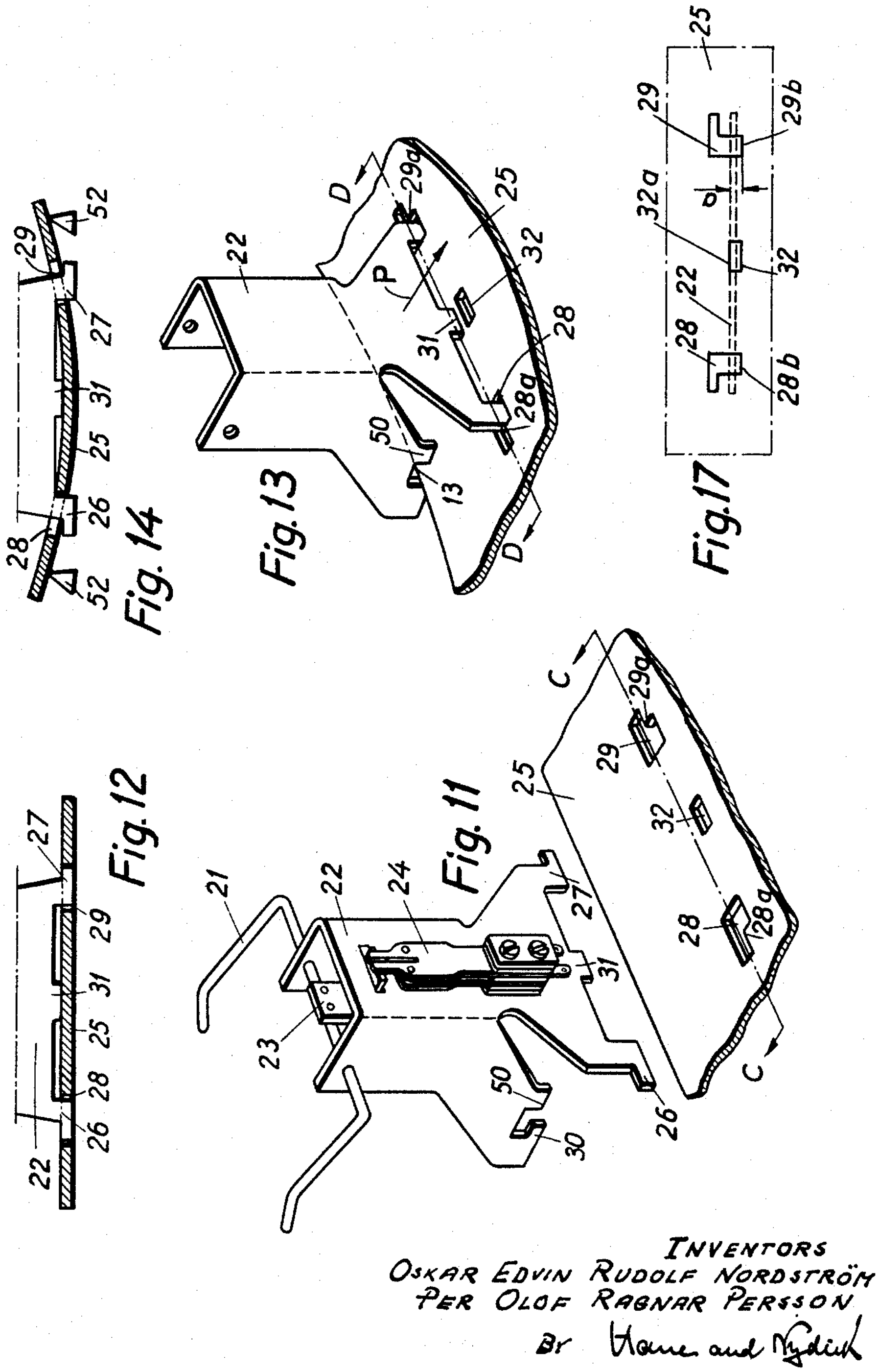
Figure 16:
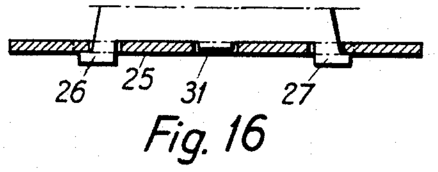
Figures 15, 19:
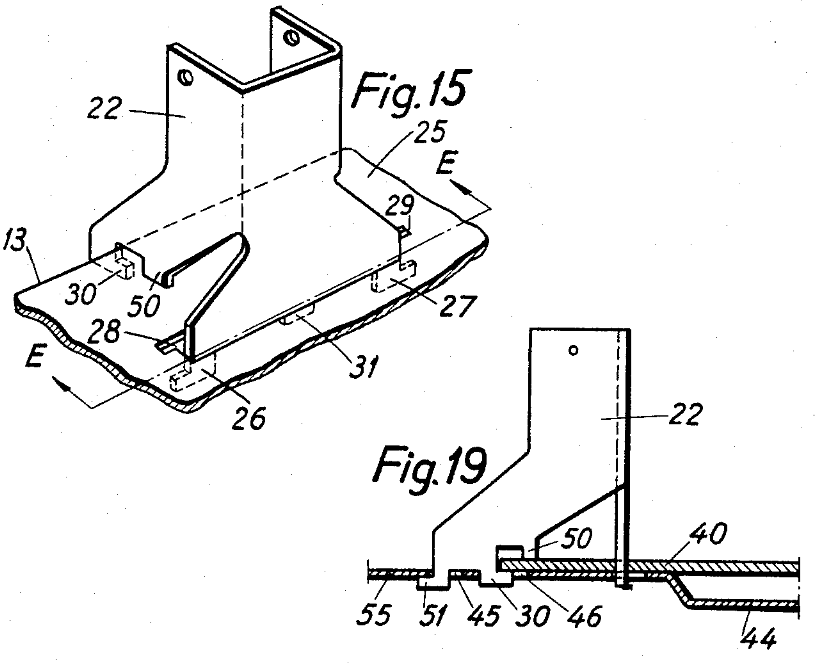
Figure 20:
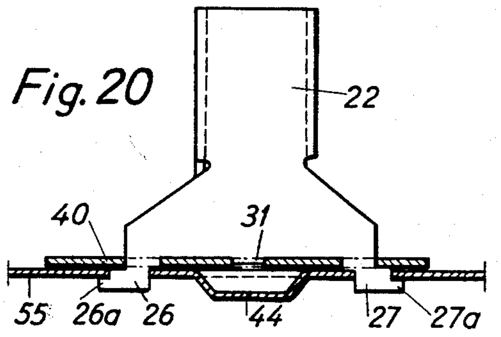
Figures 18, 21:
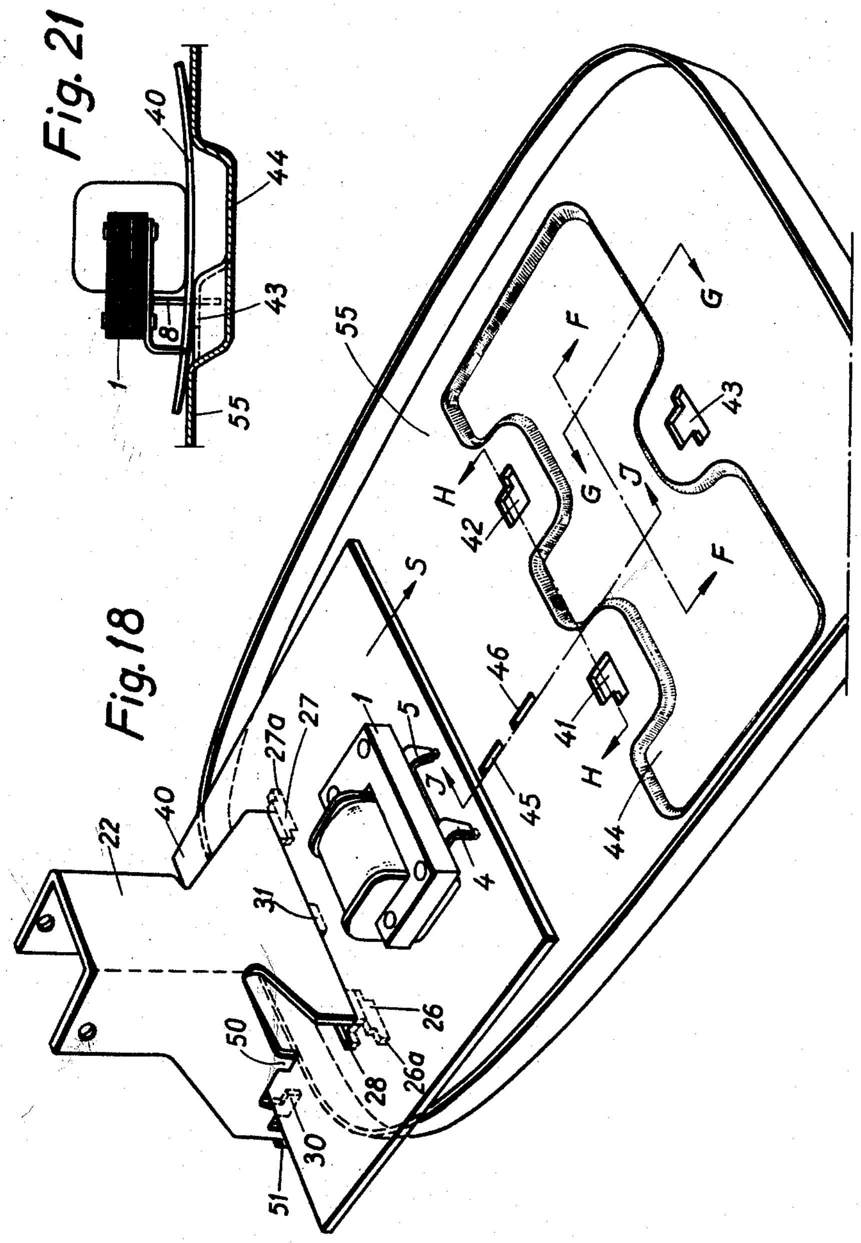

FIGS. 7 and 8 are sections on a reduced scale along the lines F—F and G—G respectively in FIG. 18, the mounting plate being supposed to be mounted on the base plate. FIGS. 9 and 10 correspond to FIG. 7 and FIG. 8 respectively and show schematically a force acting on the transformer. FIGS. 11–16 show different phases of the fastening of a frame to a mounting plate, whereby the FIGS. 11, 13 and 15 show the frame and the plate in perspective and FIGS. 12, 14 and 16 are sections along the lines C—C, D—D and E—E respectively in FIGS. 11, 13 and 15 respectively. FIG. 17 is a top plan view of a portion of the mounting plate having the iron sheet of the frame indicated by dotted lines in its position shown in FIG. 15, and FIG. 18 shows a perspective view of the mounting plate, with components mounted thereon, lifted a little distance from a base plate. FIGS. 19, 20 and 21 are sections along the lines I—I, H—H and G—G respectively in FIG. 18, the mounting plate being supposed to be fastened to the base plate.

At first will be described how a transformer is fastened to a mounting plate.

In FIG. 1 is a transformer 1 and in FIG. 2 is shown a portion of a mounting plate 40 of a resilient pliable material (for example "pertinax") to which the transformer shall be fastened. 2 is a supporting plate fastened to the sheet-iron core of the transformer by means of the same tube-rivets 3 as those which hold the sheet-iron core together. The supporting plate has on one hand a lug 8 having a neck 9 and two shoulders 10 and 11 respectively and on the other hand two lugs 4 and 5 located on either side of and a little in front of the lugs 8, each one being provided with a projecting head 6 and 7 respectively. The soldering tag of the transformer is indicated by 12. In the mounting plate 40, FIG. 2, which can be a printed-circuit plate, there are provided six holes 13 for the soldering tags 12 which holes are longer than the width of the tags so as to allow displacement in the holes. Furthermore there is provided a recess having a wider portion 14 and a narrower portion 15 intended for the lug 8 and two holes more, 16, 17, for the heads 6 and 7. When the transformer shall be mounted on the plate, the soldering tags 12 will first be pushed through the holes 13 and the lug 8 through the recess 14, the lugs 4 and 5 resting with the heads 6 and 7 against the upper surface of the plate 40 near the holes 17, 16. The transformer rests also with the corners 19 of the cheeks 18 against the plate 40, FIG. 3. The plate is then bent (which for example can occur by means of a suitable fixture, here not shown). In FIG. 4 the bending is supposed to be caused by a pressure in the direction of the arrow F. The shoulder 10 will now be located below the lower surface of the mounting plate 40 and as the width of the recess 15 is somewhat greater than the width of the neck 9 of the lug 8, the transformer can be pushed in the direction of the arrow in FIG. 4, the neck being pushed into the recess 15. At the same time the heads 6 and 7 are sliding down into the holes 17 and 16, so that the transformer then cannot be displaced in the plane of the plate, and the transformer now rests with the lugs 4 and 5 and the checks 19 of the winding bobbin 18 against the upper surface of the mounting plate 40, and due to the fact that the shoulder 10 rests against the under-side of the plate 40, the transformer cannot be drawn upwards but the transformer is securely fastened to the plate. The shoulders 11 of the lug 8 shown in FIG. 1 have no function if, as has now been described, it is only desirable to fasten the transformer to a plate, and can in this case be omitted. The function of these heads will be indicated below. FIGS. 5 and 6 show the plate in a position without tension after the bending. Through dimensioning the lugs in a suitable way it may be possible to let the plate 40 after the fastening of the transformer still have a slight bending, because the transformer then will rest against the plate with more freedom from play.

In FIGS. 11—16 is shown how a cradle switch frame for a telephone instrument is fastened to a mounting plate. The frame is indicated by 22; 21 is the turnable cradle switch lever which is operated when the handset is lifted from and restored on the cradle of the instrument and 23 is a means controlled by the lever 21 for operation of the spring set 24. This latter can be formed with soldering tabs for conventional wire connection or with soldering tags for the pushing down into a printed-circuit plate. The frame is in its lower portion provided with two lugs 26, 27 directed outwards and with a head 31 and a head 50 and with a hook 30. FIG. 11 also shows a portion of the mounting plate 25 which ought to be of a resilient pliable material, for example a "pertinax"-disc or a printed-circuit plate. The plate 25 has two recesses 28 and 29, each having a wider and a narrower portion intended for the lugs 26, 27. In the plate there is furthermore provided a hole 32 for the head 31 in the frame. When fastening the frame the lugs 26, 27 will be brought down into the wider portion of the recesses 28, 29, the heads 31 and 50 respectively resting against the plate 25. In this position the frame cannot be displaced parallelly to the plate (in the direction of the arrow P) because the projecting ends of the lugs 26, 27 nock against the corners 28*a*, 29*a* of the recesses 28, 29. The section in FIG. 12 shows this position. The plate is now exposed to bending (FIG. 13) which may occur in such a way that the plate is put on a pair of studs 52 (shown in the section in FIG. 14) outside the lugs 26, 27 and running perpendicular to the edge 13 in FIG. 13 and that the plate is pressed down between these studs as is shown in FIGS. 13, 14. The corners 28*a*, 29*a* will thereby be bent upwards, past the projecting ends of the lugs 26, 27 so that the lugs 26, 27 with their narrower portions can be pushed into the narrower portions of the recesses 28, 29, and the frame thereby be displaced parallelly to the plane of the plate in the direction of the arrow P in FIG. 13. After this movement the head 31 is located straight above the recess 32, and when the pressure against the plate ceases, the head 31 will push into the hole and blocks hereby the movement of the frame in the plane of the plate. This position corresponds to FIGS. 15, 16. The ends of the lugs 26, 27 which now are located below the plate 25 in the narrower portion of the recesses 28, 29, and the hook 30 that has gripped the edge 13 of the plate, will now block the frame against displacement in a direction perpendicularly to the plane of the plate. The head 50 rests against the upper surface of the plate.

FIG. 17, which is a top plan view of a portion of the mounting plate 25 around the recesses 28, 29 with the sheet-iron in the frame 22 indicated by dotted lines and in the position according to FIG. 15, intends to show that, if the measure "*a*" in the figure is made a little smaller than the plate-thickness of the frame 22, there will be obtained a jamming in the horizontal plane of the plate between the edge 32*a* in the recess 32 and the edges 28*b*, 29*b* in the recesses 28 and 29 respectively. The risk of getting too much play in the fastening device will then be smaller. Such a jamming in the vertical plane is also possible through suitable dimensioning of the lugs 26, 27. The under-side of the plate 25 can namely rest against the lugs when the plate is slightly bent. Also the lug 30 can grip the edge 13 of the plate, when the plate is slightly bent. Owing to this the risk of getting too much play between frame and plate will be smaller.

Above has been described the fastening of a transformer or a frame to a mounting plate. It occurs in telephone instruments that it is desirable to mount a number of electrical components on the plate and then mount this plate in the instrument. The comparatively heavy components, e.g. transformer and frame, then suitably should be fastened to the base plate of the instrument. According to this invention this can occur by means of the device shown in FIGS. 18–20. Regarding the transformer the additional shoulders 11 on the lug 8, FIG. 1, which are mentioned above, are used for this purpose. The lugs 26, 27 of the frame should be provided, as appears from FIGS. 18 and 20, with additional shoulders 26*a*, 27*a* located a little below the lugs 26, 27, besides which in the back portion of the frame a further lug 51 has to be provided. In the base plate 55 of the instrument (FIG. 18) a number of recesses is provided, viz. 43, intended for the lug 8 of the transformer; 41 and 42 intended for the additional shoulders 26*a*, 27*a* on the lugs 26, 27 of the frame; 46 intended for the lug 30 and 45 intended for the lug 51.

In FIG. 18 are shown a mounting plate 40 and a cradle switch frame 22 and a transformer 1 mounted on this plate (further components can of course be mounted on the plate). In FIG. 18 the mounting plate 40 is supposed to be held a little lifted from the base plate 55. At the fastening, the plate 40 is brought forward in the direction of the arrow S until the lug 8 (FIGS. 1 and 21) below the transformer, which lug is not shown in FIG. 18, is located straight above the wider portion of the recess 43 and the shoulders 26*a*, 27*a* of the lugs 26, 27 are located straight above the wider portion of the recesses 41, 42. The shoulders 30 and 51 are lying straight above the recesses 46 and 45. The plate 40 is now brought straight downwards so that all the lugs just mentioned are pushed into respective recesses. The plate 40 is then pushed back in a direction opposite to the arrow S, whereby the shoulders 11 on the transformer lug 8 and the shoulders 26*a*, 27*a* on the frame lugs 26, 27 respectively grip the back side of the base plate 55 at the edge to the narrower portion of the recesses 43 and 41, 42 respectively. The shoulder 51 grips the base plate at the recess 45. The recess 46 only serves to give free space for the shoulder 30, which here does not grip the base plate. The mounting plate 40 with components fastened thereto is then locked, so that it cannot be drawn up from the base plate 55 in the direction perpendicularly to the plane of the plate. This co-operation between the lugs and the recesses, which just has been mentioned, is also shown in FIGS. 7, 8 and FIGS. 19, 20 respectively, which are sections supposed to be taken after the mounting plate 40 has been fastened to the base plate 55. It appears from FIG. 18 and especially from FIG. 20 that, when the mounting plate with components is mounted on the base plate, that part of the recesses 41–43 which is not occupied by the lugs 26, 27 and 8, will be covered by the mounting plate 40 lying above. As appears from FIG. 19 also the recesses 45 and 46 in the base plate are covered by the iron plate in the frame 22 and by the mounting plate 40 respectively. Owing to this the fastening will be completely insectproof. FIGS. 7 and 8 show the transformer in fastened position in the base plate and are sections along the lines F—F and G—G respectively in FIG. 18, and FIGS. 19 and 20 show the frame in fastened position in the base plate and are sections along the lines I—I and H—H respectively in FIG. 18. Into the base plate 55, FIG. 18, a recess 44, running right across the plate, is pressed down. The purpose of said recess is to give space for soldering connections for the components arranged on the plate, said soldering connections being located below the mounting plate. The recess 44 can also protect a possible copper foil and solderings on the under-side of the mounting plate, if this latter is designed as a printed-circuit.

By means of the now described fastening device it is rendered possible that for example the transformer is able to withstand rather great accelerations, which is shown in FIGS. 9 and 10, whereby in FIG. 9 the transformer is supposed to be seen from the same side as in FIG. 6 and in FIG. 10 from the same side as in FIG. 5. T*p* designates the centre of gravity of the transformer, M the fastening point (corresponding to the lug 8 in FIG. 1). For a force $P_1$ (FIG. 9), arbitrarily directed in the plane of the drawing and acting in the point T*p*, the transformer will lie well placed on the studs A and B (which correspond to the lugs 4 and 5) and these are located at a satisfactory distance from M so as to secure that the transformer will not get loose. From FIG. 1C appears that for a force $P_2$ in the plane of the drawing the possible moment C or D will also lie at a satisfactory distance from the holding place M, and therefore the mechanical strain in M need not be exceptionally great. C then indicates the lugs 4 and 5 and D the corner 19 of the winding bobbin. For a force applied in T*p*, which force works in the horizontal plane, the heads 6 and 7 in the holes 17 and 16 and the lug 8 receive the strains arising. If the iron sheet of the base plate in a range immediately around the recess 43 is located a little lower than the other, not recessed portion of the base plate but not so low as the recess 44, the effect will be that the mounting plate becomes fixed in a somewhat bent shape in a manner shown in FIG. 21, whereby the risk of getting too much play will be decreased. The relation of the mounting plate to other components fastened to the base plate can for example be arranged according to the Swedish patent application No. 8,036/59 (corresponding to U.S. patent application No. 51,979) in which is shown how the mounting plate is locked against displacement parallelly to the plane of the plate.

We claim:

1. An arrangement for mounting a component on a support, said arrangement comprising a mounting plate made of comparatively brittle but slightly resiliently flexible insulation material, said plate having a first and second key slot, the first key slot having a narrow portion and a contiguous wide portion; and a component having a protruding first and a second key member, the first key member having a narrow portion and a contiguous wide portion, the wide portion of the first key member fitting the wide portion of the first key slot and the narrow portion of the first key member fitting the narrow portion of the first key slot, said first and second key slot and said first and second key member being disposed in a spatial relationship such that when the wide portion of the first key member occupies the wide portion of the first key slot, the second key member is out of alignment with the second key slot and rests upon said mounting plate and when the narrow portion of the first key member occupies the narrow portion of the first key slot the second key member and the second key slot are in alignment, said wide portion of the first key member being freely insertable in the wide portion of the first key slot within the thickness of the mounting plate in a plane substantially normal to the plane of the mounting plate but is blocked in said normal direction against deeper insertion by the second key member resting upon the mounting plate and against displacement in the plane of the mounting plate by the boundary walls of said first key slot therein, bending of the plate portion including said first key slot towards the component effecting deeper insertion of the first key member to free the wide portion of the first key member from said boundary walls of the plate thereby releasing said member and to displace the narrow portion of the first key member into the narrow portion of the first key slot, said displacement placing the second key slot in alignment with the second key member for entering the latter into the second key slot, whereby upon relaxation of the plate the component is locked in the plate against perpendicular and transverse displacement by the wide portion of the first key member underlying the plate and the second key member engaging the second key slot.

2. An arrangement for mounting a component on a support, said arrangement comprising a mounting plate made of comparatively brittle but slightly resiliently flexible insulation material, said plate having a first and a second key slot, the first key slot being substantially T-shaped; and a transformer having protruding from one of its sides a first and a second key member, the first key member being substantially T-shaped and disposed below the center of gravity of said transformer in reference to the mounting plate, the cross arm of the T-shaped key member fitting the cross arm of the T-shaped key slot and the other arm of the T-shaped key member fitting the other arm of the T-shaped key slot, said first and second key slot and said first and second key member being disposed in a spatial relationship such that when the cross arm of the T-shaped key member occupies the cross arm of the T-shaped key slot, the second key member is out of alignment with the second key slot and when the other arm of the T-shaped key member occupies the other arm of the T-shaped key slot, the second key member and the second key slot are in alignment, said cross arm of the first key member being freely insertable in the cross arm of the first key slot within the thickness of the mounting plate in a plane substantially normal to the plane of the mounting plate, but blocked in said normal direction against deeper insertion by the second key member resting upon the mounting plate and against displacement in the plane of the mounting plate by the boundary walls of said T-shaped key slot therein, bending of the plate portion including said T-shaped key slot toward the component effecting deeper insertion of the first key member and freeing the cross arm of the first key member from the boundary walls of the plate to release said member for displacement of its other arm into the other arm of the T-shaped key slot, said displacement placing the second key slot in alignment with the second key member for entering the latter in the second key slot whereby upon relaxation of the plate the transformer is locked in the plate against perpendicular and transverse displacement by the cross arm of the first key member underlying the plate and the second key member engaging the second key slot.

3. An arrangement according to claim 2 wherein two second key slots and two coacting second key members are provided, said first key member and said two second key members defining an isosceles triangle, said first key member being at the apex of the triangle.

4. An arrangement according to claim 2 wherein said transformer has a laminated core, and also comprising a sheet metal plate and fastening means securing together said sheet metal plate and the laminae of said core, said first and second key members being formed of bent-out portions of said sheet metal plate.

5. An arrangement for mounting a component on a support, said arrangement comprising a mounting plate made of comparatively brittle but slightly resiliently flexible insulation material, said plate having a first and a second key slot, the first key slot being L-shaped; and a component having protruding from one of its sides a first and a second key member, the first key member being substantially L-shaped, the long arm of the first key member fitting the long arm of the first key slot and the short arm of the first key member fitting the short arm of the first key slot, said first and second key slot and said first and second key member being disposed in a spatial relationship such that when the long arm of the first key member occupies the long arm of the first key slot, the second key member is out of alignment with the second key slot and rests upon said mounting plate and when the short arm of the first key member occupies the short arm of the first key slot, the second key member and the second key slot are in alignment, said long arm of the first key member being insertable in the long arm of the first key slot within the thickness of the mounting plate in a plane substantially normal to the plane of the mounting plate but is blocked in said normal direction against deeper insertion by the second key member resting upon the mounting plate and against displacement in the plane of the mounting plate by the boundary walls of said first key slot therein, bending of the plate portion including said first key slot towards the component effecting deeper insertion of the first key member and freeing the long arm of the first key member from said boundary walls of the plate to release said member for displacement of its short arm into the short arm of the first key slot, said displacement placing the second key slot in alignment with the second key member for entering the latter in the key slot whereby upon relaxation of the plate, the component is locked in the plate against perpendicular and transverse displacement by the long arm of the first key member underlying the plate and the second key member engaging the second key slot.

6. An arrangement according to claim 5 wherein said component is a cradle switch member made of sheet metal and wherein two first key members extend from a wall portion of said switch member and said second key member is disposed between said two first key members.

7. An arrangement according to claim 6 wherein a hook-shaped key member extends from another wall portion of the switch member, said hook-shaped key member underlying an edge of the mounting plate when the first and second key members engage the mounting plate in locking position.

8. An arrangement according to claim 5 and further comprising a base plate having an L-shaped key slot placeable in registry with the L-shaped key slot in the mounting plate, said L-shaped key member having its long arm set off to form an outer elongated portion of said long arm, said elongated portion being engageable with the long arm of the key slot in the base plate and underlying said base plate when the component is locked to the mounting plate, thereby locking the two plates to each other in parallel relationship.

9. An arrangement according to claim 2 and further comprising a base plate having a T-shaped key slot placeable in registry with the T-shaped key slot in the mounting plate, said T-shaped key member having its cross arm set off to form outer elongated portions of said cross arm, said elongated portions being engageable with the cross arm of the key slot in the base plate and underlying said base plate when the component is locked to the mounting plate thereby locking the two plates to each other in parallel relationship, said base plate having a deeply recessed area to provide space for soldering operations on the mounting component supported upon the mounting plate and a shallow recessed area immediately surrounding said first key slot in said base plate, said shallow recessed area providing space for a portion of the mounting plate to enable said mounting plate to obtain a slightly bent configuration.

10. An arrangement according to claim 2 wherein said first and said second key members fit the respective key slots with a pressure fit to prevent play between the component and the mounting plate.

11. An arrangement according to claim 1, wherein said component has a supporting surface bearing against said mounting plate, said first key member being located between said second key member and said supporting surface.

References Cited in the file of this patent

UNITED STATES PATENTS 2,708,088 Steinke ---------------- May 10, 1955

FOREIGN PATENTS 1,186,195 France ---------------- Aug. 17, 1959